Figure 1:
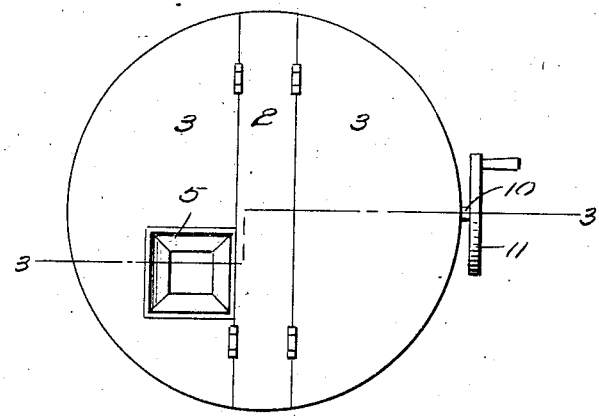

April 13, 1926.

A. ZVORIAS 1,580,273

VEGETABLE CUTTER

Filed Feb. 11, 1925

Inventor
Anton Zvorias.

By
Attorney

Patented Apr. 13, 1926.

1,580,273

UNITED STATES PATENT OFFICE.

ANTON ZVORIAS, OF NEW YORK, N. Y.

VEGETABLE CUTTER.

Application filed February 11, 1925. Serial No. 8,418.

*To all whom it may concern:*

Be it known that I, ANTON ZVORIAS, a citizen of Russia, residing at New York, in the county of New York and State of New York, have invented certain new and useful Improvements in a Vegetable Cutter, of which the following is a specification.

The present invention relates to a vegetable cutter and has for its principal object to provide a device of this nature possessed of an extremely simple and efficient structure, one which is fairly reliable in operation, inexpensive to construct, strong, durable, easy to clean, not liable to readily get out of order, adjustable, and otherwise well adapted for the purpose for which it is designed.

With the above and numerous other objects in view as will appear as the description proceeds, the invention resides in certain novel features of construction, and in the combination and arrangement of parts as will be hereinafter more fully described and claimed.

In the drawings:—

Figure 2:
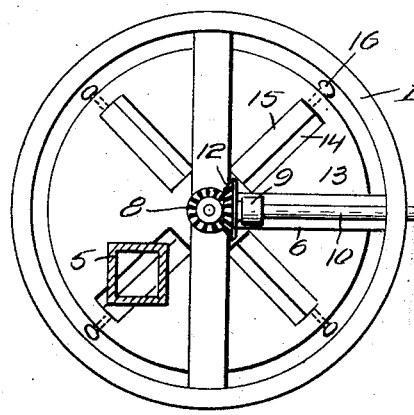
Figure 3:
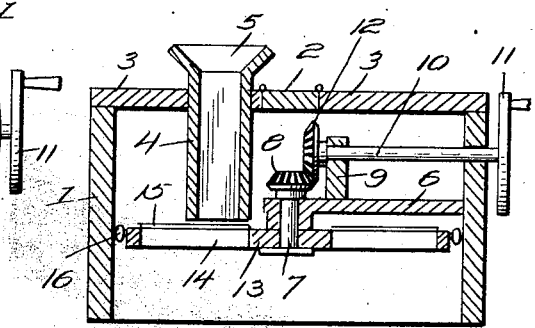

Figure 1 is a top plan view of the apparatus embodying the features of my invention, Figure 2 is a top plan view thereof with the cover removed, and Figure 3 is a vertical section therethrough taken substantially on the line 3—3 of Figure 1.

Referring to the drawing in detail it will be seen that 1 designates a cylindrical casing open at its end. A bridge strip 2 extends diametrically across one open end of the cylindrical casing 1 and has hinged thereto cover plates 3. A guide member 4 extends through one of the cover plates 3 and has its upper end flared to form a feeding hopper 5. A support 6 radiates inwardly from the side wall of the cylindrical casing 1 terminating at the axis thereof. A spindle 7 is journaled in the inner end of the support 6 axially with the center of the cylindrical casing 1 and has fixed to its upper end a beveled gear 8. A bracket 9 extends upwardly from the support 6 and has journaled therethrough a shaft 10 which is also journaled through the side wall of the cylindrical casing 1. At the outer end of this shaft 10 there is disposed an operating crank wheel 11, and at the inner end thereof there is disposed a beveled gear 12 meshing with beveled gear 8. Below the support 6 on the spindle 7 there is mounted a rotary disc 13 having radially disposed slots 14 formed therein. Mounted above these slots are blades or knives 15 adjustable by members 16 so as to extend at desired angles in relation to the upper surface of the disc 13.

When the crank wheel 11 is rotated, the shaft 10 is rotated for actuation of beveled gear 12. This beveled gear 12 rotates the bevel gear 8, thereby rotating the spindle 7 and disc 13 so that the knives 15 pass by the lower end of the guide 4 and cut the fruit which projects slightly therebelow, thereby delivering the slices of the fruit through the slots 14 to the receptacle over which the cylindrical casing 1 may be disposed.

It will be apparent from the above that I have devised a very simple vegetable cutter which is easy to manipulate, one which can be readily cleaned, and which will be thoroughly efficient in operation. This apparatus may be placed on the market at a very low cost and will attain all the features of invention and advantages thereof enumerated as desirable in the statement of the invention and the above description. It is further apparent that numerous changes in the details of construction, and in the combination and arrangement of parts may be resorted to without departing from the spirit or scope of the invention as hereinafter claimed or sacrificing any of its advantages.

Having thus described my invention, what I claim as new is:—

A vegetable cutter including, in combination, a casing, a cutting mechanism in the casing, a cover hinged to the casing, and a guide extending through the cover and fixed thereto so as to lead to the cutting mechanism and closely approach thereto when the cover is in closed position, said guide being swingable out of the casing to an out of the way position when the cover is opened.

In testimony whereof I affix my signature.

ANTON ZVORIAS.